L. L. WESTLING.
EDIBLE CONE SHAPER.
APPLICATION FILED MAY 19, 1908.
913,597.
Patented Feb. 23, 1909.
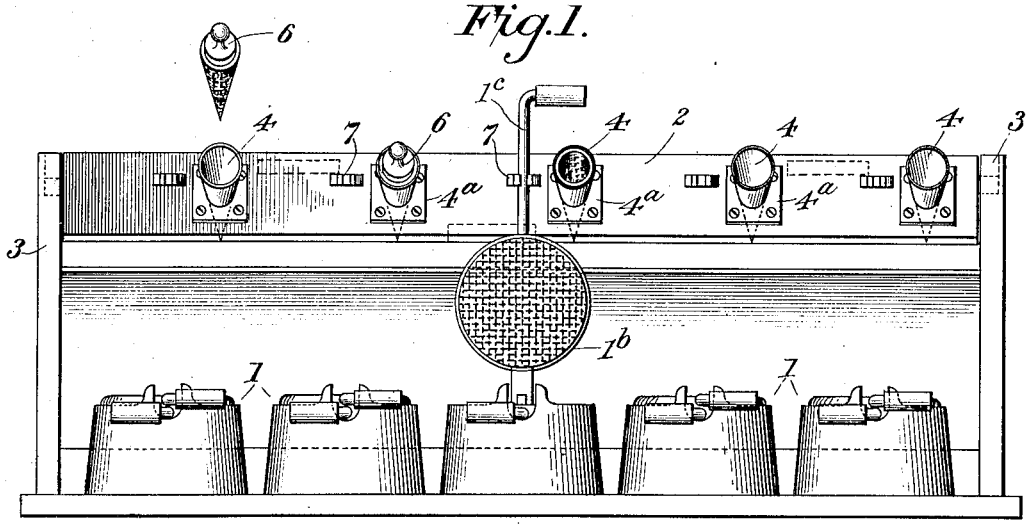
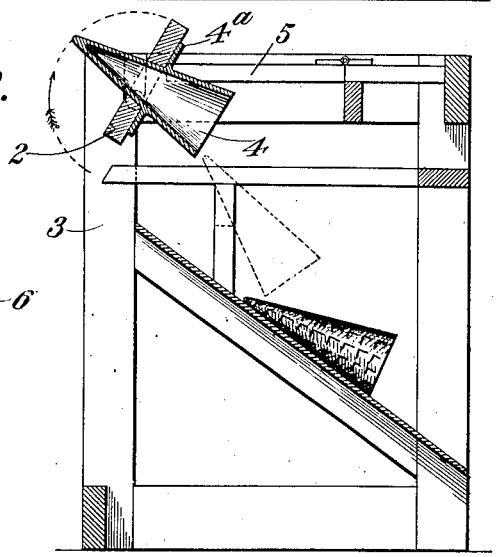
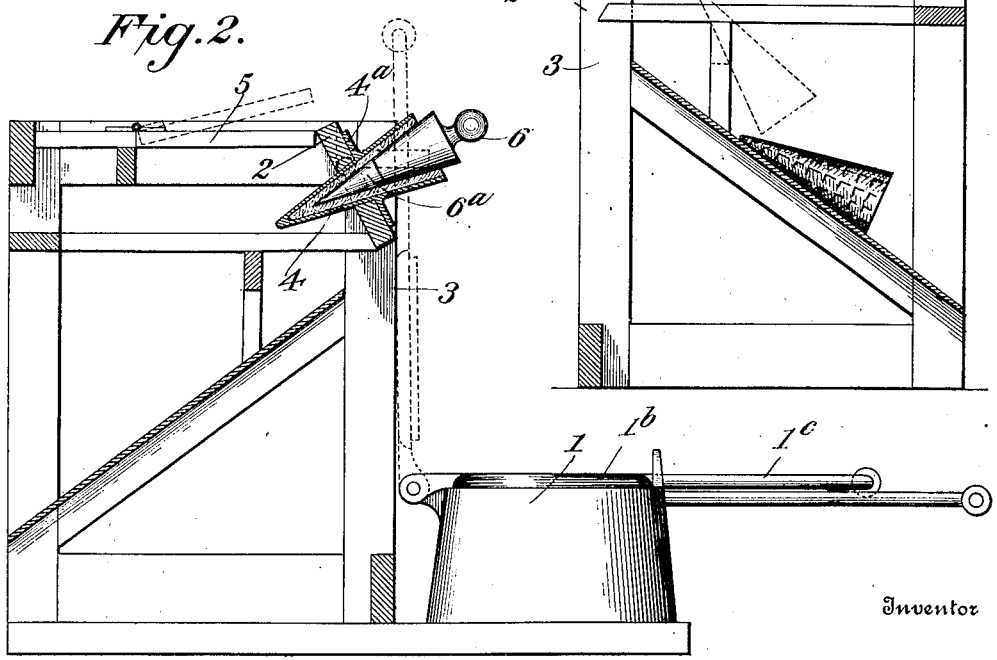
Inventor
Leonard L. Westling.

UNITED STATES PATENT OFFICE.

LEONARD L. WESTLING, OF PITTSBURG, PENNSYLVANIA.

EDIBLE-CONE SHAPER.

No. 913,597.  Specification of Letters Patent.  Patented Feb. 23, 1909.

Application filed May 19, 1908. Serial No. 433,732.

*To all whom it may concern:*

Be it known that I, LEONARD L. WESTLING, of Pittsburg, in the county of Allegheny and State of Pennsylvania, have invented certain new and useful Improvements in Edible-Cone Shapers; and I hereby declare that the following is a full, clear, and exact description thereof, reference being had to the accompanying drawings, which form part of this specification.

This invention is an improved utensil for use in the manufacture of "cones" in which ice-cream and the like is retailed and the object of this invention is to enable the cones to be made of uniform size and shape, thereby enabling them to be packed in smaller compass for transportation and at the same time greatly facilitating their manufacture and lessening liability of burning the operator or baker in shaping them.

The invention in brief comprises a hollow cone-shaper, or series of such shapers, mounted on a tiltable support adjacent the baking irons or oven in which the waffles are cooked, and what I term, a solid or internal cone-shaper upon which the hot waffle is wrapped and then inserted into the hollow shaper, and after all the hollow shapers are filled and the cones properly hardened they can be dumped into a suitable receptacle or out of the way by turning the tiltable support. The hollow shapers are located conveniently to the waffle irons and the support is also useful for holding the waffle irons in open position while the cooked waffles are removed and fresh batter placed therein.

The invention will be clearly understood from the accompanying drawings and the following description thereof.

In said drawings: Figure 1 is a front elevation of the apparatus. Fig. 2 is a section thereof showing the shapers in receiving position. Fig. 3 is a section showing the shapers in discharging position.

In the drawings, 1, 1, designates a series of waffle-irons or ovens of ordinary construction which are preferably arranged in a horizontal row. Back of and above these ovens 1, is a bar or tiltable support 2, which is pivotally journaled in standards or brackets 3 attached to a suitable support and to this tiltable support 2 are attached a series of hollow shapers 4, which are cone-shaped and conform internally to the external shape of the finished cones. These shapers 4 are preferably made of metal and attached to the tiltable support 2 in any suitable manner. As shown each shaper 4 is provided with lateral flanges $4^a$ which are fastened to the support 2 by screws or nails. The support 2 being shown as if formed of wood, in the drawings. The hollow shapers preferably transfix the support 2, and as shown their pointed ends project beyond the rear thereof.

The support 2 is fastened in such position that the shapers are inclined upwardly and outwardly and the open ends are toward the operator and oven. The support 2 can be held in this position by means of a latch-piece 5 if desired. One or more internal shapers 6 also of cone shape, and preferably having their points $6^a$ of metal, are used in connection with the shapers 4 to form the cones.

The support 2 may be provided with spring-fingers 7 on its forward side in position to engage the handles $1^c$ of the upper member $1^b$ of the waffle-iron, as shown in Fig. 1, so as to hold the latter in open position while the iron is being filled with batter and while the cooked waffles are being removed therefrom.

The number of cone-shapers employed depends upon the number of waffle-irons used and the size thereof. Ordinarily six cone-shapers and six irons are used in a set which would be as much as one baker or operator could handle, but of course the number of shapers provided would depend upon the number and size of the waffle-irons and the size of the cones.

In operation the waffle-irons are supplied with batter and when a waffle is cooked the iron is opened as indicated and the cooked waffle removed and quickly wrapped around the internal shaper 6 and inserted within a hollow shaper 4, the shaper 6 being left in the shaper 4 until another waffle is cooked; when it can be removed and such waffe wrapped therearound and placed in another shaper 4, and so on, until all the shapers 4 are full; then the finished cones can be dumped from the shapers 4 into a suitable receptacle by lifting the latch 5 and tilting the support 2 over to the position indicated in Fig. 3, all the cones dropping out of the shapers by gravity; then the support upon being given a start will return to normal position ready to receive another set of cones.

By this means the hot waffles are easily made cone-shape, and the resultant cones will be of uniform conical form, and the joint at the overlapped edges of the cones will be tighter and less liable to leak. A very much better looking product is obtained than is possible when the cones are simply shaped by hand and set to cool; and all the advantages of the hand-made cones are retained; and the apparatus greatly facilitates the manufacture of the cones.

Having described my invention what I claim as new and desire to secure by Letters Patent is:

1. In an apparatus for shaping edible cones, the combination of a female cone-shaper, and a male shaper around which a waffle is to be wrapped and inserted in the hollow shaper.

2. The combination with means for cooking waffles, a hollow external shaper and an internal shaper around which a waffle may be wrapped and inserted in the hollow shaper, the internal shaper giving the set and form to the interior of the cone.

3. In an apparatus for shaping waffle-cones, the combination of a tiltable support, a hollow shaper attached thereto, and a male shaper around which a waffle is to be wrapped and inserted in the hollow shaper.

4. The combination with means for cooking waffles, a movable tiltable support, a series of hollow shapers mounted thereon, and a male shaper around which waffles may be wrapped and inserted in the hollow shapers.

5. In an apparatus for shaping edible cones, the combination of a tiltable pivoted support, hollow shapers thereon, and a latch for securing the support when the shapers are in receiving position.

6. In an apparatus for shaping edible cones, the combination with means for cooking waffles, of a pivoted support, a plurality of hollow shapers mounted on such support, a latch for holding the support with the shapers in receiving position, and a male shaper for inserting waffles in the hollow shapers.

In testimony that I claim the foregoing as my own, I affix my signature in presence of two witnesses.

LEONARD L. WESTLING.

Witnesses:
J. S. McGRATH,
F. M. CAIN.